Patented July 28, 1931

1,816,326

UNITED STATES PATENT OFFICE

WILLY O. HERRMANN AND HANS DEUTSCH, OF MUNICH, GERMANY, ASSIGNORS TO CONSORTIUM FUER ELEKTROCHEMISCHE INDUSTRIE, OF MUNICH, GERMANY

PROCESS FOR THE PRODUCTION OF ACETALDEHYDE

No Drawing. Application filed October 9, 1926, Serial No. 140,673, and in Germany October 26, 1925.

We have found that it is possible to promote the production of acetaldehyde from acetylene and water in the presence of mercury compounds by adding a solvent for acetylene. By this means, the acetaldehyde process is improved, the rate of production being increased and the efficiency of the mercury catalyst being raised to a very satisfactory value.

Among the solvents especially apt for the purpose of this invention are the organic compounds containing a hydroxylic group, especially mono- and polyhydric alcohols, phenols, carboxylic acids. Instead of using these compounds in free state, substances may be applied which are capable of splitting off hydroxylic compounds such as acetals, esters and the like. Whether these solvents take part of the reaction, forming intermediary reaction products, is not essential for the carrying out of our invention.

The water necessary for the formation of the acetaldehyde may be added according to its consumption by the reaction or it may be used in a more or less large excess. It may be preferable to use it in the form of vapor in order to raise or maintain the suitable reaction temperature.

The vapor mixture escaping from the reaction apparatus is advantageously fractionated in a fractionating column or a similar acting apparatus. By this means, vaporized organic solvents, e. g. alcohol, are condensed and continuously carried back into the reaction apparatus.

The separation of the acetaldehyde may be promoted by a strong vaporization of the reaction liquid which is advantageously increased by a gas stream especially an excess of acetylene. This excess of acetylene is preferably led back into the reaction apparatus in a circulating manner after having been more or less freed from acetaldehyde by condensation, washing or the like. The danger of resinification being practically avoided by this process, it is not necessary to perfectly wash out the acetaldehyde from the circulating gas and it is possible to use washing apparatus of small size and to get a higher concentrated aldehyde water.

The stirring of the reaction liquid may be caused or supported by the excess of acetylene. The rate of flow of acetylene may also be regulated in such manner that the excess of the reaction heat is carried off by vaporization and the suitable reaction temperature maintained in this way without special measures for heating or cooling.

Our process may be supplemented by working under more than atmospheric pressure, thus increasing the solubility of acetylene in the reaction mixture and making it possible to work at higher temperatures.

Mercury salts of inorganic acids may be used, the relation of the base and the acid varying within large bounds.

In carrying out the process the reaction mixture itself may also be circulated. A more complete agitation of the contents of the reaction vessel is produced by this circulation; the desired reaction being thus facilitated and the control and maintenance of the proper reaction temperature within the reaction vessel being made possible externally and independently of the dimensions of the reaction vessel.

Besides this the circulation of the reaction liquid makes it possible to remove the catalyst in a continuous or discontinuous manner, to regenerate it and to carry it back in regenerated form. The reaction liquid being practically free of resin the regeneration of the catalyst may be accomplished very simply and without loss.

When circulating the reaction liquid the control and maintaining of its composition are facilitated. For instance the quantity and concentration of the acid may be maintained at a satisfactory value by adding water, acid or the like or by removing part of it.

The regeneration of the catalytic reaction liquid being simple and convenient a good method of carrying out the process is to periodically or continuously remove part of the reaction liquid and to add in the same measure reaction liquid in regenerated form. In this way a kind of circulation of the catalyst and a better efficiency of it are attained and a better performance of the whole process is realized.

The reaction components such as water, catalyst and solvent are added in a continuous or discontinuous manner according to their consumption.

Example 1

A vessel provided with a stirrer and a fractionating column was charged with an emulsion of 30 parts of mercury sulfate in 900 parts of water and 80 parts of ethyl alcohol. The temperature was kept at about 95° C. by means of live steam. Acetylene was then pressed in with a velocity of 1600 parts per hour the temperature being about 95° C. In the same time an emulsion of 23 parts of mercury sulfate in 100 parts of water was added partly continuously, partly periodically. The excess of acetylene containing vapors of water, alcohol, acetaldehyde and intermediarily formed acetal passed the fractionating column which was so regulated that the escaping gas had a temperature of 15 to 17° C. The condensed vapors were led back into the reaction vessel whilst the acetylene passed the column with the main part of the acetaldehyde which was removed in a washing apparatus by water. The acetaldehyde was obtained by continuous distillation from the washing water, and the second running, which contained parts of alcohol not condensed in the fractionating column, was added to the catalytic emulsion and carried back in this way into the reaction process. The residue of the aldehyde distillation was used for charging the washing apparatus. The acetylene freed from the acetaldehyde was led back into the reaction vessel by a circulating pump. According to its consumption fresh acetylene was added. According to the impurities in the circulating gas parts of it were removed.

In the example described about 130 parts of pure acetaldehyde were produced per hour, the efficiency of the acetylene being nearly quantitative. The reaction mixture was practically free from resin and the consumed catalyst separated out partly as regulinic mercury partly in the form of a clean metallic slime. The mercury was separated from the reaction liquid without difficulty. A very active catalyst was regenerated simply and practically without loss.

The process may be conducted in such a manner that the alcohol vapors escaping from the reaction mixture are not condensed in the fractionating column but are obtained as a second running in the distillation of the raw acetaldehyde and carried back into the reaction process with the catalytic emulsion.

Example 2

A vessel provided with a stirrer and a fractionating column was charged with an emulsion of 30 grams of mercury sulfate and a mixture of 900 grams of methanol and 100 grams of water. At 52 to 54° C. a stream of acetylene of 1600 liters per hour was allowed to flow in. At the same time an emulsion of 23 grams of mercury sulfate and 100 grams of water was added per hour. The process was carried out according to Example 1.

150 grams of acetaldehyde were obtained per hour. The reaction liquid was almost free from resin and the mercury was won in a clean form easily to be regenerated.

Example 3

The process was carried out essentially as shown in Example 1. However during the process reaction liquid was removed continuously and continuously substituted by a regenerated catalytic emulsion. The reaction liquid was removed to a settling vessel and the catalyst which had become inactive was separated from it. The reaction liquid thus cleared was allowed to flow into an emulsifier and emulsified with 2,3 per cent of regenerated mercury sulfate. The catalytic emulsion thus regenerated was led back into the reaction vessel by a pump. The mercury obtained from the settling vessel was dissolved in nitric acid, transformed into mercury sulfate, added to the emulsifier and incorporated in this way into the reaction process in a cyclic manner. From time to time the reaction liquid when enriched with sulfuric acid was substituted by a mixture of 90 percent of water and 10% of alcohol. Water was added according to its consumption by the reaction and by evaporation.

From a vessel filled with 1000 parts of the reaction mixture 400 parts of pure acetaldehyde were obtained. Practically no resinification took place. The mercury catalyst was regenerated simply and without loss.

The method of circulating the reaction liquid may be varied in any suitable manner. The regeneration of the mercury catalyst may also be continuously operated. Iron salts, chromates and the like may be added to the reaction liquid in the circulating way for instance by means of a tower or any other suitable apparatus. Another method for regenerating the mercury catalyst during the reaction is a suitable electrolytical oxidation process.

In the manufacture described only the acetaldehyde leaves the reaction apparatus. All the other components of the reaction may remain in the circulation process.

If regenerating the mercury catalyst by dissolving in nitric acid and separating out by addition of sulfuric acid, the sulfuric acid for this purpose may be taken from the reaction liquid. The nitric acid may again be used for regeneration. In this way the regenerating means may remain in the circulating process.

As the resinification is practically avoided in this process also the water residue remaining in the distillation process for obtaining the acetaldehyde may be used again so that the losses of mercury are restricted to a minimum.

The above examples are typical for the operation of our process, but we do not wish to be limited to these examples which only illustrate our invention.

What we claim is:

1. Process of producing acetaldehyde by causing acetylene to react upon water in the presence of a mercury compound of an inorganic acid and a physical solvent for acetylene miscible with the reaction liquid.

2. Process of producing acetaldehyde by causing acetylene to react upon water in the presence of a mercury compound of an inorganic acid, and a solvent for the acetylene and working under an excess pressure up to three atmospheres.

3. Process of producing acetaldehyde by causing acetylene to react upon water in the presence of a mercury compound of an inorganic acid, and a compound containing a hydroxylic group.

4. Process of producing acetaldehyde by causing acetylene to react upon water in the presence of a mercury compound of an inorganic acid and a compound containing a hydroxylic group and working under an exess pressure up to three atmospheres.

5. Process of producing acetaldehyde by causing acetylene to react upon water in the presence of a mercury compound of an inorganic acid and a solvent for the acetylene and continuously removing the formed acetaldehyde from the reaction mixture by a forced vaporization.

6. Process of producing acetaldehyde by causing acetylene to react upon water in the presence of a mercury compound of an inorganic acid and a compound containing a hydroxylic group and continuously removing the formed acetaldehyde from the reaction mixture by a forced vaporization.

7. Process of producing acetaldehyde by causing acetylene to react upon water in the presence of a mercury compound of an inorganic acid and a compound containing a hydroxylic group and continuously removing the formed acetaldehyde from the reaction mixture by a stream of gas.

8. Process of producing acetaldehyde by causing acetylene to react upon water in the presence of a mercury compound of an inorganic acid and a compound containing a hydroxylic group and continuously removing the formed acetaldehyde from the reaction mixture by an excess of acetylene.

9. Process of producing acetaldehyde by causing acetylene to react upon water in the presence of a mercury compound of an inorganic acid and a compound containing a hydroxylic group and continuously removing the formed acetaldehyde from the reaction mixture by an excess of acetylene between 2 and 50 times the quantity of acetylene absorbed, the excess of acetylene being carried back to the process in a circulating manner.

10. Process of producing acetaldehyde by causing acetylene to react upon water in the presence of a mercury compound of an inorganic acid, and a compound containing a hydroxylic group and continuously removing the formed acetaldehyde from the reaction mixture by an excess of acetylene whilst stirring the reaction mixture by the stream of acetylene.

11. Process of producing acetaldehyde by causing acetylene to react upon water in the presence of a mercury compound of an inorganic acid and a compound containing a hydroxylic group and continuously removing the formed acetaldehyde from the reaction mixture by an excess of acetylene whilst circulating the reaction mixture.

12. Process of producing acetaldehyde by causing acetylene to react upon water in the presence of a mercury compound of an inorganic acid, adding a compound containing a hydroxylic group and continuously removing the acetaldehyde thus formed from the reaction mixture, continuously removing part of the reaction liquid and continuously substituting it by a regenerated catalytic emulsion.

13. Process of producing acetaldehyde by causing acetylene to react upon water in the presence of a mercury compound of an inorganic acid and a compound containing a hydroxylic group and continuously removing the formed acetaldehyde from the reaction mixture by an excess of circulating acetylene fractionally condensing the reaction vapor mixture and leading back the higher boiling portion of the condensate into the reaction mixture.

14. Process of producing acetaldehyde by causing acetylene to react upon water in the presence of a mercury compound of an inorganic acid and a compound containing a hydroxylic group and continuously removing the formed acetaldehyde from the reaction mixture by an excess of acetylene fractionally condensing the reaction vapor mixture and leading back the higher boiling portion of the condensate and the aqueous residue of the distillation of the lower boiling condensate into the reaction mixture.

WILLY O. HERRMANN.
HANS DEUTSCH.